Patented Nov. 1, 1927.

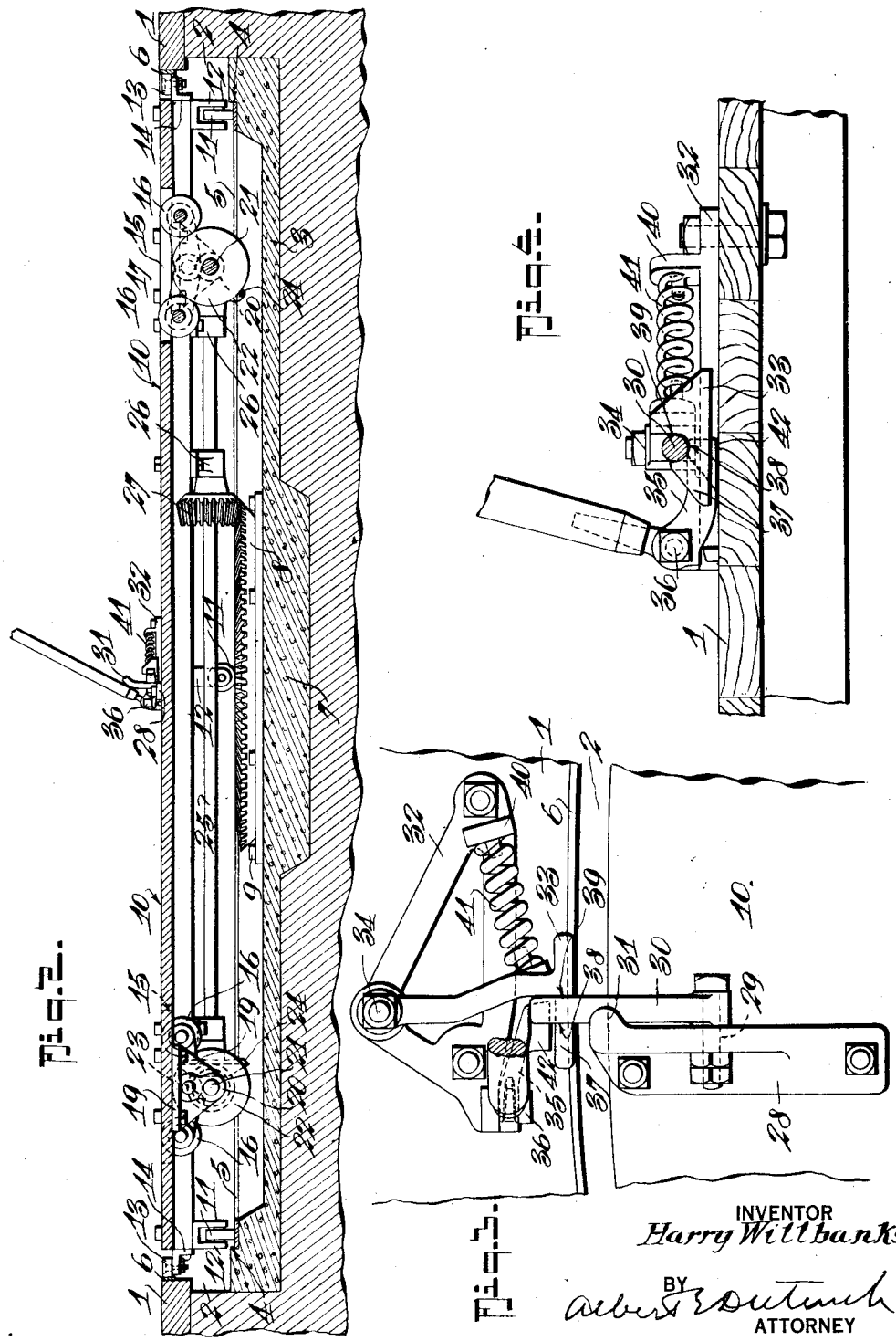

1,647,678

UNITED STATES PATENT OFFICE.

HARRY WILLBANKS, OF ATLANTA, GEORGIA.

GARAGE TURNTABLE.

Application filed August 9, 1926. Serial No. 128,262.

This invention generally relates to turntables and primarily has for its object to provide a simple and efficient device of that character adaptable to use in garages or the like and which includes means actuated by the automobile while upon the turn-table for rotating said turn-table.

In its more detailed nature the invention seeks to provide a turn-table upon which an automobile is adapted to be driven to be moved thereby to position angular to its "driven on" position, said turn-table including rollers and gearing devices set into motion by rotative engagement of the automobile drive wheels with said rollers and adapted to effect rotation of said turn-table, and means for stopping rotation of the turn-table at predetermined points.

With the above and other objects in view that will hereinafter appear the invention further resides in the novel details of construction, combination and arrangement of parts, all of which will be first fully described, then be particularly pointed out in the appended claims, reference being had to the accompanying drawings, in which:—

Figure 2 is a cross section of the turn-table.

Figure 3 is an enlarged detail plan view illustrating the function of the turn-table "stop" devices.

Figure 4 is an elevation of the stop bracket and lock pin release arm, the lock pin being shown in section and the anti-friction track being removed.

Figure 1:
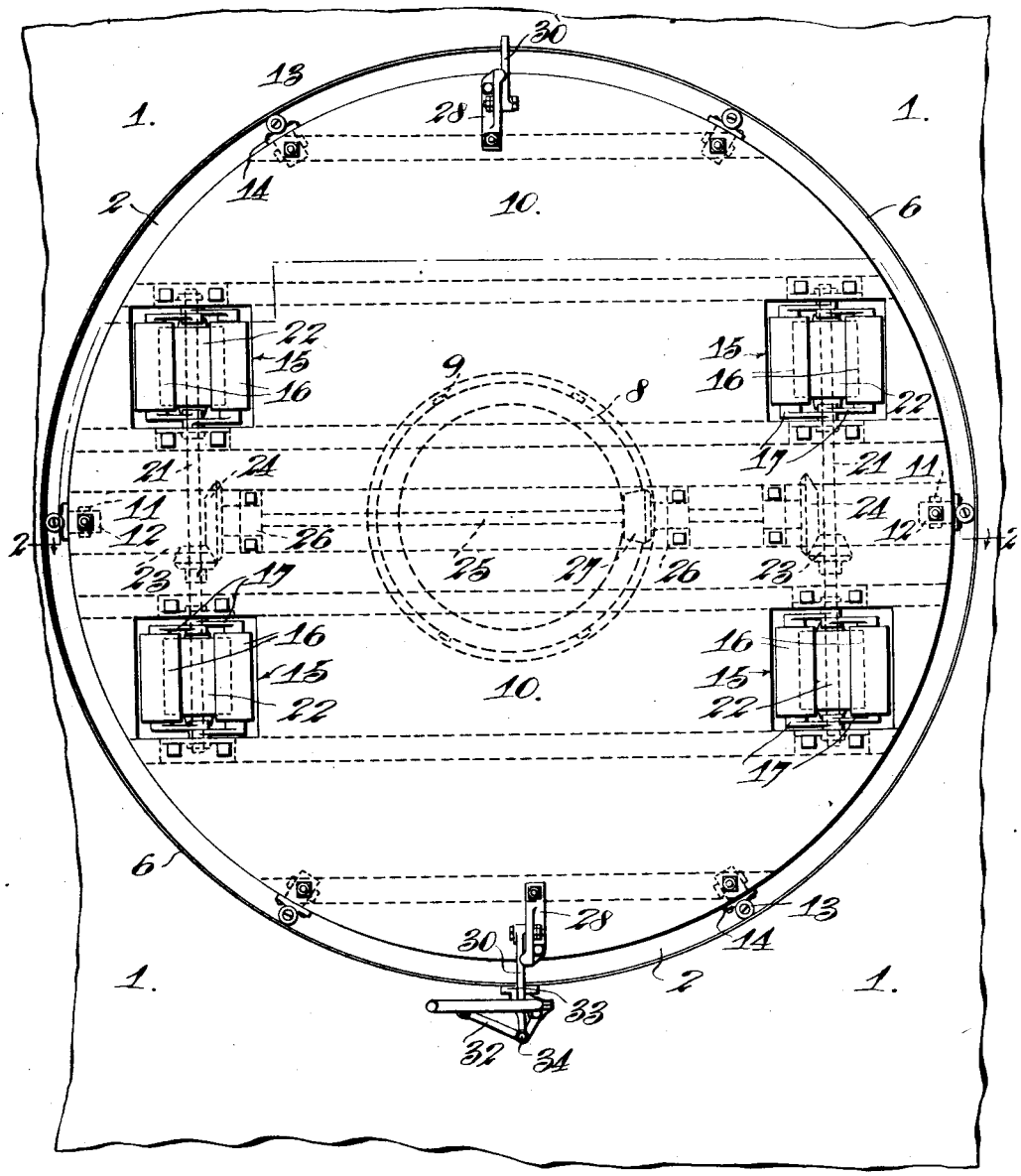
Figure 1 is a plan view of my improved turn-table.

In the drawings, in which like numerals of reference indicate like parts in all of the figures, 1 indicates a garage floor which may be constructed in any approved manner and which includes the circular opening 2 for accommodating a rotatable table.

A table supporting base 3 is provided and constructed in any suitable manner as, for example, of concrete, to comprise an annular rim portion 4 having a depressed shoulder for accommodating the metal annular track 5 upon which the rotatable table forming the turn-table body is supported in a manner soon to be described.

The internal face of the circular opening 2 is provided with a metal lining or anti-friction track 6, the purpose of which will presently appear.

The base 3 includes a reinforce center portion 7 upon which the ring gear 8 is supported and secured as at 9.

The rotatable table is indicated at 10 and may be constructed of wood, metal or any other suitable material. The turn-table 10 is rotatably mounted upon a plurality of anti-friction rollers 11 carried in brackets 12 secured to and depending from the bottom face of the said turn-table and which ride on the track 5 hereinbefore referred to.

The turn-table 10 is also provided with a plurality of rollers 13 carried by brackets 14 secured to the periphery of the said turn-table to project radially therefrom into engagement with the anti-friction track or band 6 lining the circular opening 2.

Thus the turn-table 10 is supported and rotatably mounted upon the rollers 11 and the anti-friction rollers 13 effectively serve to overcome edge friction.

The turn-table 10 is provided with a plurality of recesses or openings 15. In the preferred embodiment of my invention four such recesses are provided and are preferably positioned for receiving the four wheels of an automobile or other like vehicle.

A pair of rollers 16 are mounted in each opening 15 upon link members 17 pivoted on the studs 18 mounted in brackets 19, secured to and depending from the lower face of the turn-table in the positions indicated.

The brackets 19 also include depending bearing portions 20 in which are rotatably mounted the cross shafts 21, each said cross shaft having secured thereupon to rotate therewith a friction roller 22 for cooperating with each pair of rollers 16 in a manner soon to be described.

The shafts 21 are also each provided with a bevelled pinion 23 adapted to mesh with the bevelled gears 24, one thereof being secured to each end of the driven shaft 25 rotatably mounted in the bearings 26 secured to and depending from the table 10. The driven shaft 25 is also provided with a bevelled pinion 27 adapted to mesh with the ring gear 8 hereinbefore referred to.

It will be observed that each single roller 22 is mounted beneath and centrally of a pair of rollers 16 and in view of the manner of link-mounting the said pairs of rollers when weight is applied thereto they are forced downwardly into tight frictional contact with the said single roller so that rotation imparted to the said pair of rollers will be frictionally imparted to the said single roller, causing rotation of the respective cross shaft 21 and through the driven shaft 25 and its pinion engagement with the ring gear 8 to the turn-table 10.

Thus, when it is desired to utilize my improved turn-table for permitting the turning of an automobile in a relatively short space the automobile is driven upon the turn-table and its driving wheels (rear wheels) brought into engagement with two adjacent pairs of rollers 16. It should be here explained that each pair of rollers is so spaced as to form a shallow depression therebetween into which the wheels will drop and act as a sort of chock to prevent movement of the vehicle while permitting the wheels thereof to rotate. It is also preferred that the depressions be so positioned that both fore and rear wheels will rest therein to thus hold the car against undesired movement.

For effecting an automatic stop of the turn-table at predetermined points I provide the table 10 with a plurality of brackets 28, each having pivoted thereto, as at 29, a lock pin 30, and being equipped with upper and lower limiting lugs 31 for limiting vertical movement of the said lock pins. While I have disclosed but two of the lock pin devices and positioned them at diametrically opposite points on the said table, it should be understood that these devices may be positioned at more frequent intervals around the table if desired. It will be observed that the lock pins are so arranged that they project beyond the periphery of the said turn-table.

At a single point on the floor 1, I secure a bracket 32 having a lock arm 33 pivoted thereto as at 34 and a releasing lever 35 pivoted thereto as at 36.

The lock arm 33 has an upwardly inclined advance cam face 37 leading to a lock pin receiving groove 38. The lock groove 38 terminates in an upstanding abutment or stop lug 39 against which the lock pin 30 is moved as the turn-table reaches the position of the said lock arm and which serves to stop the turn-table against further movement.

To absorb the shock of this stopping of the turn-table I provide means for permitting a yielding of the said lock arm abutment lug. For this purpose, the bracket 32 is provided with an upstanding lug 40 and a spring 41 is interposed between the said lug and the stop lug 39.

The lever 35 is provided with a releasing foot 42 which extends to a position beneath the lock pin 30 when in the groove 38 so that upon manipulation of the lever the said pin can be lifted out of the groove 38 and over the stop lug 39 to permit further rotation of the turn-table.

In the foregoing description I have disclosed a simple and efficient turn-table structure which may be rotated by power imparted from the power wheels of a vehicle mounted upon the said turn-table, means being provided for safely holding the vehicle against undesired movement while the turn-table is being utilized and means also being provided for stopping the turn-table at a predetermined point without undue shock or strain on the operative parts of the mechanism.

In this disclosure I have described and illustrated one detailed embodiment of the principles of the invention but it should be understood that other embodiments of the structure may be made such as come within the scope of the appended claims without departing from the spirit of the invention.

From the foregoing description, it is thought the novel details of construction, manner of use and advantages of my invention will be readily apparent to those skilled in the art to which it relates.

What I claim is:

1. A device of the class described comprising a rotatable table, means adapted to be operated by engagement of at least one drive wheel of a vehicle upon said table to rotate said table, means for stopping the table against rotation at a predetermined point, said stopping means including a yieldable abutment member mounted on a fixed support beyond the periphery of the turntable.

2. A device of the class described comprising a rotatable table, means adapted to be operated by engagement of at least one drive wheel of a vehicle upon said table to rotate said table, means for stopping the table against rotation at a predetermined point, said stopping means comprising a single stop device stationarily mounted beside the table, and a plurality of stop pins spaced at intervals to project from the table into position for engaging said stop device.

3. In a device of the class described, a rotatable table having at least one recess therein, a pair of rollers in said recess, a single roller in said recess beneath said pair of rollers, means for mounting the pair of rollers in said recess in a manner permitting them to move downwardly into tight frictional engagement with the single roller under weight of a vehicle and in spaced relation for forming a depression therebetween to receive a driven wheel of such vehicle and chock said vehicle wheel to prevent movement of said vehicle while permitting said wheel to rotate and impart rotation to said rollers, and means connected with the single roller for imparting rotation therefrom to said rotatable table.

4. In a device of the class described, a rotatable table having at least one recess therein, a pair of rollers in said recess, a single roller in said recess beneath said pair of rollers, means for mounting the pair of rollers in said recess in a manner permitting them to move downwardly into tight frictional engagement with the single roller under weight of a vehicle and in spaced relation for forming a depression therebetween to receive a driven wheel of such vehicle and chock said vehicle wheel to prevent movement of said vehicle while permitting said wheel to rotate and impart rotation to said rollers, a gear secured to a fixed support, a drive shaft carried by the rotatable table, a pinion on said drive shaft and meshing with said gear, and means for imparting rotation to said drive shaft from said single roller.

5. In a device of the class described, a rotatable table having at least one recess therein, rollers rotatably mounted in the recess in spaced relation for forming a depression therebetween to receive a driven wheel of a vehicle upon said table and chock said wheel to prevent movement of said vehicle while permitting said wheel to rotate and impart rotation to said rollers, means connected with at least one of said rollers for imparting rotation therefrom to said rotatable table, and means for stopping the table against rotation at a predetermined point.

6. In a device of the class described, a rotatable table having at least one recess therein, rollers rotatably mounted in the recess in spaced relation for forming a depression therebetween to receive a driven wheel of a vehicle upon said table and chock said wheel to prevent movement of said vehicle while permitting said wheel to rotate and impart rotation to said rollers, means connected with at least one of said rollers for imparting rotation therefrom to said rotatable table, means for stopping the table against rotation at a predetermined point, said stopping means comprising a single stop device stationarily mounted beside the table, and a plurality of stop pins spaced at intervals to project from the table into position for engaging said stop device.

7. A device of the class described comprising a rotatable table, means adapted to be operated by engagement of at least one drive wheel of a vehicle upon said table to rotate said table, means for stopping the table against rotation at a predetermined point; said stopping means comprising a single stop device stationarily mounted beside the table, and a plurality of vertically pivotal stop pins spaced at intervals to project from the table into position for engaging said stop device; said stop device comprising a stationary bracket, a lock arm pivoted on said bracket and having a stop pin opposing abutment and a locking depression, a spring carried by said bracket and engaging said lock arm to oppose movement thereof under urge of a table carried stop pin, and a lever for lifting said stop pin out of the locking depression and over the lock arm to release the rotatable table and permit rotation thereof.

8. In a device of the class described a rotatable table having four recesses therein, a pair of rollers in each recess, a single roller in each recess beneath said pair of rollers, means for mounting each pair of rollers in their recess in a manner permitting downward movement thereof into frictional contact with the single roller under weight of a vehicle and in spaced relation for forming a depression therebetween, each depression to receive one of the wheels of such vehicle and chock said vehicle against movement while permitting the drive wheels of such vehicle to rotate and impart rotation to said rollers, and means connected with the single rollers for imparting rotation therefrom to said rotatable table.

9. A device of the class described comprising a rotatable table and means for effecting rotation thereof, means for stopping the table against rotation at a predetermined point, said stopping means including a yieldable abutment member, a fixed support on which said yieldable member is mounted beyond the periphery of the turntable, and a locking pin on the rotatable table and projecting radially therefrom and adapted to be brought into engagement with said yieldable abutment member for the purposes described.

10. A device of the class described comprising a rotatable table and means for effecting rotation thereof, means for stopping the table against rotation at a predetermined point, said stopping means including a yieldable abutment member, a fixed support on which said yieldable abutment member is mounted, a locking pin on the rotatable table adapted to be brought into engagement with said yieldable abutment member, said yieldable abutment member including a pivoted arm having a lock pin receiving groove to receive the lock pin, means pivotally mounting said lock pin to rise and fall with respect to said groove, and a lever device mounted adjacent said yieldable abutment member for lifting said stop pin out of said groove and over the yieldable abutment member to free the same when desired.

HARRY WILLBANKS.